(12) United States Patent
Hung et al.

(10) Patent No.: US 7,719,568 B2
(45) Date of Patent: May 18, 2010

(54) IMAGE PROCESSING SYSTEM FOR INTEGRATING MULTI-RESOLUTION IMAGES

(75) Inventors: Yi-Ping Hung, Taipei (TW); Wei-Shian Yeh, Taipei (TW)

(73) Assignee: National Chiao Tung University, Hsinchu (TW)

( * ) Notice: Subject to any disclaimer, the term of this patent is extended or adjusted under 35 U.S.C. 154(b) by 550 days.

(21) Appl. No.: 11/611,851

(22) Filed: Dec. 16, 2006

(65) Prior Publication Data

US 2008/0143821 A1  Jun. 19, 2008

(51) Int. Cl.
H04N 7/18 (2006.01)
H04N 5/225 (2006.01)
G06K 9/36 (2006.01)

(52) U.S. Cl. ............... 348/159; 348/153; 348/143; 348/218.1; 382/284

(58) Field of Classification Search ......... 348/143–160, 348/218.1, 222.1; 382/284
See application file for complete search history.

(56) References Cited

U.S. PATENT DOCUMENTS

| | | | | |
|---|---|---|---|---|
| 4,276,028 A * | 6/1981 | Gwynn | .................. | 434/20 |
| 5,434,617 A * | 7/1995 | Bianchi | .................. | 348/170 |
| 5,532,737 A * | 7/1996 | Braun | .................. | 348/36 |
| 5,703,604 A * | 12/1997 | McCutchen | .................. | 345/8 |
| 6,215,519 B1 * | 4/2001 | Nayar et al. | .................. | 348/159 |
| 6,226,035 B1 * | 5/2001 | Korein et al. | .................. | 348/335 |
| 6,346,950 B1 * | 2/2002 | Jouppi | .................. | 345/660 |
| 6,738,073 B2 * | 5/2004 | Park et al. | .................. | 345/629 |
| 6,853,809 B2 * | 2/2005 | Pelletier | .................. | 396/85 |
| 7,321,386 B2 * | 1/2008 | Mittal et al. | .................. | 348/169 |
| 7,356,425 B2 * | 4/2008 | Krahnstoever et al. | .................. | 702/94 |
| 7,382,931 B2 * | 6/2008 | Kang et al. | .................. | 382/274 |
| 7,530,019 B2 * | 5/2009 | Kjeldsen et al. | .................. | 715/730 |
| 7,583,815 B2 * | 9/2009 | Zhang et al. | .................. | 382/103 |
| 7,619,658 B2 * | 11/2009 | Baker et al. | .................. | 348/218.1 |
| 2002/0113878 A1 * | 8/2002 | Iwai et al. | .................. | 348/187 |
| 2002/0118224 A1 * | 8/2002 | Levanon et al. | .................. | 345/748 |
| 2002/0145660 A1 * | 10/2002 | Kanade et al. | .................. | 348/36 |
| 2002/0167537 A1 * | 11/2002 | Trajkovic | .................. | 345/649 |
| 2004/0001149 A1 * | 1/2004 | Smith | .................. | 348/218.1 |
| 2004/0071367 A1 * | 4/2004 | Irani et al. | .................. | 382/284 |
| 2004/0125207 A1 * | 7/2004 | Mittal et al. | .................. | 348/169 |
| 2005/0073585 A1 * | 4/2005 | Ettinger et al. | .................. | 348/155 |
| 2005/0134685 A1 * | 6/2005 | Egnal et al. | .................. | 348/157 |
| 2005/0237390 A1 * | 10/2005 | Mittal et al. | .................. | 348/169 |
| 2006/0197839 A1 * | 9/2006 | Senior et al. | .................. | 348/169 |
| 2006/0203090 A1 * | 9/2006 | Wang et al. | .................. | 348/143 |

(Continued)

OTHER PUBLICATIONS

Raskar et al., "Multi-Projector Displays Using Camera-Based Registration", IEEE Visualization, 1999.*

(Continued)

*Primary Examiner*—David L Ometz
*Assistant Examiner*—Richard M Bemben

(57) ABSTRACT

The image processing system for integrating multi-resolution images mainly applies several different multi-resolution image capture devices to extract the images from the observed scene and using the multi-resolution imaging devices to present the scene images relative to the observed scenes, respectively. In order to present a seamless image according to two different-resolution image sources, the coordinate conversions among the image capture devices, and among the imaging devices are mainly applied to extract and present the entire image to be able to resemble having a single image capturing source and a single imaging source.

4 Claims, 4 Drawing Sheets

U.S. PATENT DOCUMENTS

| | | | |
|---|---|---|---|
| 2006/0222209 A1* | 10/2006 | Zhang et al. | 382/107 |
| 2007/0070190 A1* | 3/2007 | Yin et al. | 348/36 |
| 2007/0126864 A1* | 6/2007 | Bhat et al. | 348/51 |
| 2008/0101724 A1* | 5/2008 | Baker et al. | 382/284 |
| 2008/0117296 A1* | 5/2008 | Egnal et al. | 348/143 |
| 2008/0218641 A1* | 9/2008 | Kjeldsen et al. | 348/746 |
| 2008/0259179 A1* | 10/2008 | Senior et al. | 348/222.1 |
| 2008/0291279 A1* | 11/2008 | Samarasekera et al. | 348/159 |
| 2008/0316434 A1* | 12/2008 | Hung et al. | 353/37 |

OTHER PUBLICATIONS

Sukthankar et al., "Smarter Presentations: Exploiting Homography in Camera-Projector Systems", IEEE 2001.*
Stauffer et al., "Automated multi-camera planar tracking correspondence modeling", IEEE 2003.*

* cited by examiner

IMAGE PROCESSING SYSTEM FOR INTEGRATING MULTI-RESOLUTION IMAGES

BACKGROUND OF THE INVENTION

1. Field of the Invention

The present invention relates generally to an image processing system, and in particular to an image processing system for integrating multi-resolution images.

2. The Prior Arts

A conventional video surveillance system usually cannot provide adequately effective surveillance tracking coverage, due to restrictions in video camera (VC) video capture area and in mounting locations, thus forming blind spots in certain regions and bringing about loopholes in security surveillance. In order to enlarge the surveillance coverage, one method is to add more VCs for covering the required surveillance area. But the related problems are increased setup costs and difficulties of having many VCs to be managed together. Even when using the faster Speed Dome VC during manual operation or fixed-point patrol, there is also a surveillance blind area problem due to the inevitable time lag.

In order to resolve the problems above, a wide-angle panoramic surveillance system, which is an intelligent, omni-directional video surveillance system with 360-degree panoramic video capture capability and high resolution image capture capability, is applied. In this system, if it is desired to further observe a particular designated objects or human, one only needs to select the 360-degree panoramic video option to be able to quickly acquire the high definition video for a particular region. Generally, the system provides many undistorted browsing modes for reverting the panoramic video back to the typically normal video. With respect to the detailed content of the above wide-angle panoramic surveillance system, one can refer to the following weblink: http://www.eerise.com.tw/prd_panoview.htm.

However, in the aforementioned system, in order to transmit the high-resolution and high quality videos, the requirement for transmission bandwidth is thus relatively high. As a result, the usage cost is also thus increased. If a low-resolution video acquiring is used instead and a high-resolution display device for displaying is used in certain necessary instances, the system only can effectively reduce the requirement on the transmission bandwidth, but it is difficult to use low-resolution video for presenting high-quality video by means of high-resolution video display methods.

SUMMARY OF THE INVENTION

A primary objective of the present invention is to provide an image processing system for integrating multi-resolution images, which depends on the distributed processing methods such as extracting and imaging. That is the separate application of high-resolution image extracting and browsing on particularly focused human or object images, and the application of low-resolution image extracting and browsing/imaging on the background images for reducing the bandwidth requirements without sacrificing on the high-quality browsing/imaging needs.

According to the objective above, this system applies multi-resolution image capture devices to extract images from the observed scene, and makes use of the multi-resolution imaging device to present the scene image relative to the observed scene, respectively, for avoiding the difficulty of browsing sufficiently high-quality images using the low-resolution images by imaging/browsing under the high-resolution method. In order to present the image seamlessly according to two different-resolution image sources, the coordinate conversions among the image capture devices and among the imaging devices, respectively, are mainly applied to extract and browse the entire image to be able to resemble the condition of having a single image capture source and a single imaging source.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

An image processing system for integrating multi-resolution images in accordance with this present invention mainly uses a multi-resolution image capture device (unit of angular resolution is in pixel/degree.) to extract images from an observed scene, and applies a plurality of multi-resolution imaging devices having varying degree of resolutions to present scene image relative to the observed scene, which depends on the distributed processing methods such as extraction and browsing/imaging. That is the application of high-resolution image extracting and browsing on the particularly focused human or object images, and the application of low-resolution image extracting and browsing on the background images for reducing the bandwidth requirements without sacrificing on the high-quality browsing/imaging needs.

Figure 1:
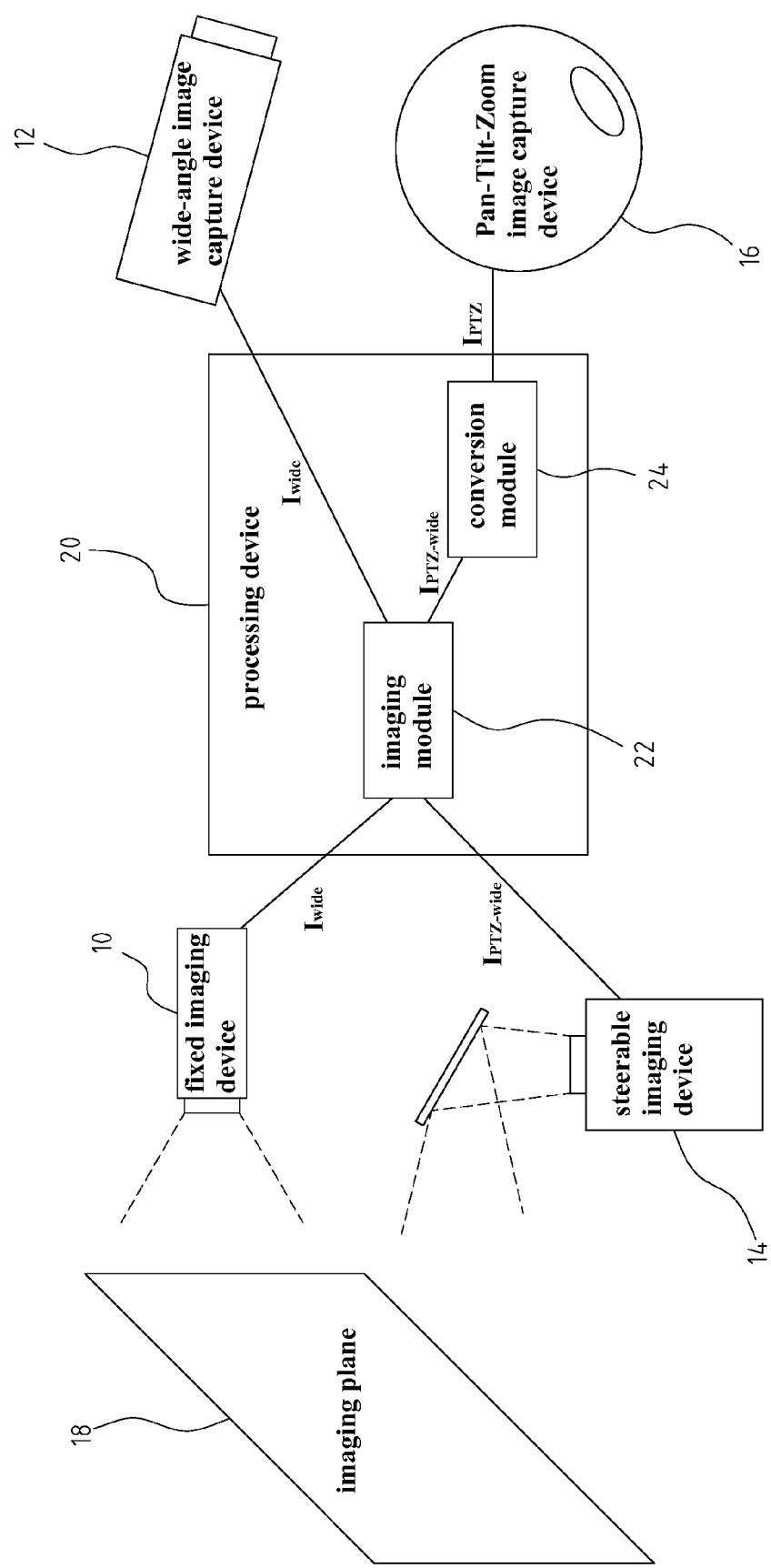
FIG. 1 is a schematic view showing an image processing system for integrating multi-resolution images according to the present invention.

With reference to the FIG. 1, FIG. 1 is a schematic view showing an image processing system for integrating multi-resolution images according to the present invention. As illustrated in FIG. 1, in the present invention, the system mainly includes two image capture devices of different resolutions, which are a wide-angle image capture device 12 and a Pan-Tilt-Zoom (PTZ) image capture device 16, two imaging devices of different resolutions, which are a fixed imaging device 10 and a steerable imaging device 14, and a processing device 20. The lens of the Pan-Tilt-Zoom (PTZ) image capture device 16 can be moved right and left as well as up and down, and also has zoom capability. The steerable imaging device 14 can be realized by using a projector device having a reflector which can be adjusted according to the projected target and region.

In general, the first resolution of the wide-angle image capture device 12 is lower than the second resolution of the Pan-Tilt-Zoom (PTZ) image capture device 16. Meanwhile, the third resolution of the fixed imaging device 10 is also lower than the fourth resolution of the steerable imaging device 14.

Briefly, in this system, in order to present the image seamlessly from two different-resolution image sources, the coordinate conversions among the image capture devices and among the imaging devices, respectively, are mainly applied to extract and browse the entire image to be able to resemble the condition of having a single image capture source and a single imaging source. First, the operation mode of this whole system is briefly described, and then the methods for integrating the two-resolution images, the method for specifying the high-resolution imaging, and the method for to generating the imaging device conversion matrix ($H_{steer}^{fixed}$) are discussed.

Referring to FIG. 1, the wide-angle image capture device 12 is to capture the observed scene according to the first resolution and produces a wide-angle image ($I_{wide}$). Based on an automatic selection mode or a user selection mode (shown in FIG. 4), the Pan-Tilt-Zoom (PTZ) image capture device 16 captures the observed scene according to the second resolution, the system or the user designated direction, and the focal distance to produce a Pan-Tilt-Zoom image ($I_{PTZ}$).

After receiving the aforementioned wide-angle image ($I_{wide}$) and the PTZ image ($I_{PTZ}$), the system can first perform distortion correction processing on the wide-angle image ($I_{wide}$), and then transmits the images to be transmitted to the imaging module 22 for presentation. Before the imaging module 22 stitches the PTZ image ($I_{PTZ}$) and the wide-angle image ($I_{wide}$), the conversion module 24 converts the PTZ image ($I_{PTZ}$) to the conversion image ($I_{PTZ-wide}$) in the coordinate system of the wide-angle image capture device 12 based on the image capture device conversion matrix (homography; $H_{wide}^{PTZ}$) in the conversion module 24, which therefore produces the effect of a single image capturing source.

According to the generation of the image capture device conversion matrix ($H_{wide}^{PTZ}$), the Pan-Tilt-Zoom (PTZ) image capture device 16 captures the observed scene under all possible directions and focus distances. The captured scenes are compared with the ones captured by the wide-angle image capture device 12, and are analyzed among each other to generate the image capture device conversion matrix ($H_{wide}^{PTZ}$)

Figure 2:
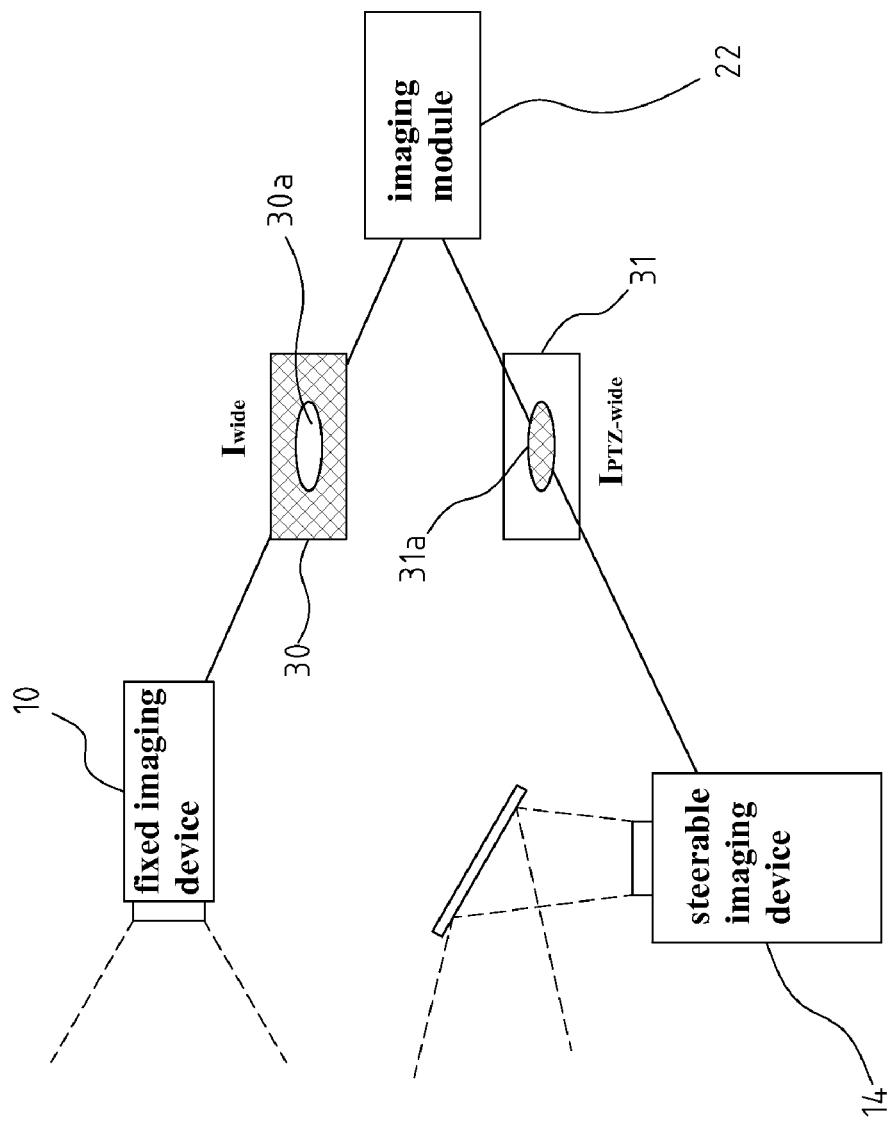
FIG. 2 is a schematic view showing the multi-resolution image stitching system according to the present invention.

Referring to FIG. 2, FIG. 2 is a schematic view showing the multi-resolution image stitching system according to the present invention. As shown in FIG. 2, when stitching two different-resolution images (the low resolution wide-angle image ($I_{wide}$) and the high resolution conversion image ($I_{PTZ-wide}$), the imaging module 22, through the fixed imaging device 10, is to present the processed wide-angle image ($I_{wide}$) 30 on the imaging plane 18 according to the third resolution, and applies the coordinate system of the steerable imaging device 14 to present the processed Pan-Tilt-Zoom image ($I_{PTZ-wide}$) 31 on the imaging plane 18 according to the fourth resolution at the same time for presenting the scene images relative to the observed scenes.

According to the processed wide-angle image ($I_{wide}$) 30 and the processed Pan-Tilt-Zoom image ($I_{PTZ-wide}$) 31 above, the processed wide-angle image ($I_{wide}$) 30 includes the low-resolution image extracted by the wide-angle image capture device 12 with low-resolution and the reserved region 30a without image information at least. But for the processed Pan-Tilt-Zoom image ($I_{PTZ-wide}$) 31, only the region 31a corresponding to the reserved region 30a possesses image information. In other words, the processed Pan-Tilt-Zoom image ($I_{PTZ-wide}$) 31 only includes the image which is originally found in the reserved region 30a. But, this image is a high-resolution image provided by the PTZ image capture device 16 with high-resolution.

When stitching images of different resolutions, the imaging device conversion matrix ($H_{steer}^{fixed}$) (the coordinate conversion matrix between the fixed imaging device 10 and the steerable imaging device 14), the image capture device conversion matrix (homography; $H_{wide}^{PTZ}$) (which is the coordinate conversion matrix between the wide-angle image capture device 12 and the PTZ image capture device 16.) and the coordinate conversions ($H_{surf}^{fixed-1}$, $H_{surf}^{steer-1}$) between the fixed imaging device 10, the steerable imaging device 14, and the imaging plane 18 are all obtained under the same method after capturing and analyzing the images. However, the coordinate conversion between the two imaging devices 10, 14 and the imaging plane 18 belongs to the commonly-known correction methods of imaging devices, which is not illustrated in details.

Figure 3:
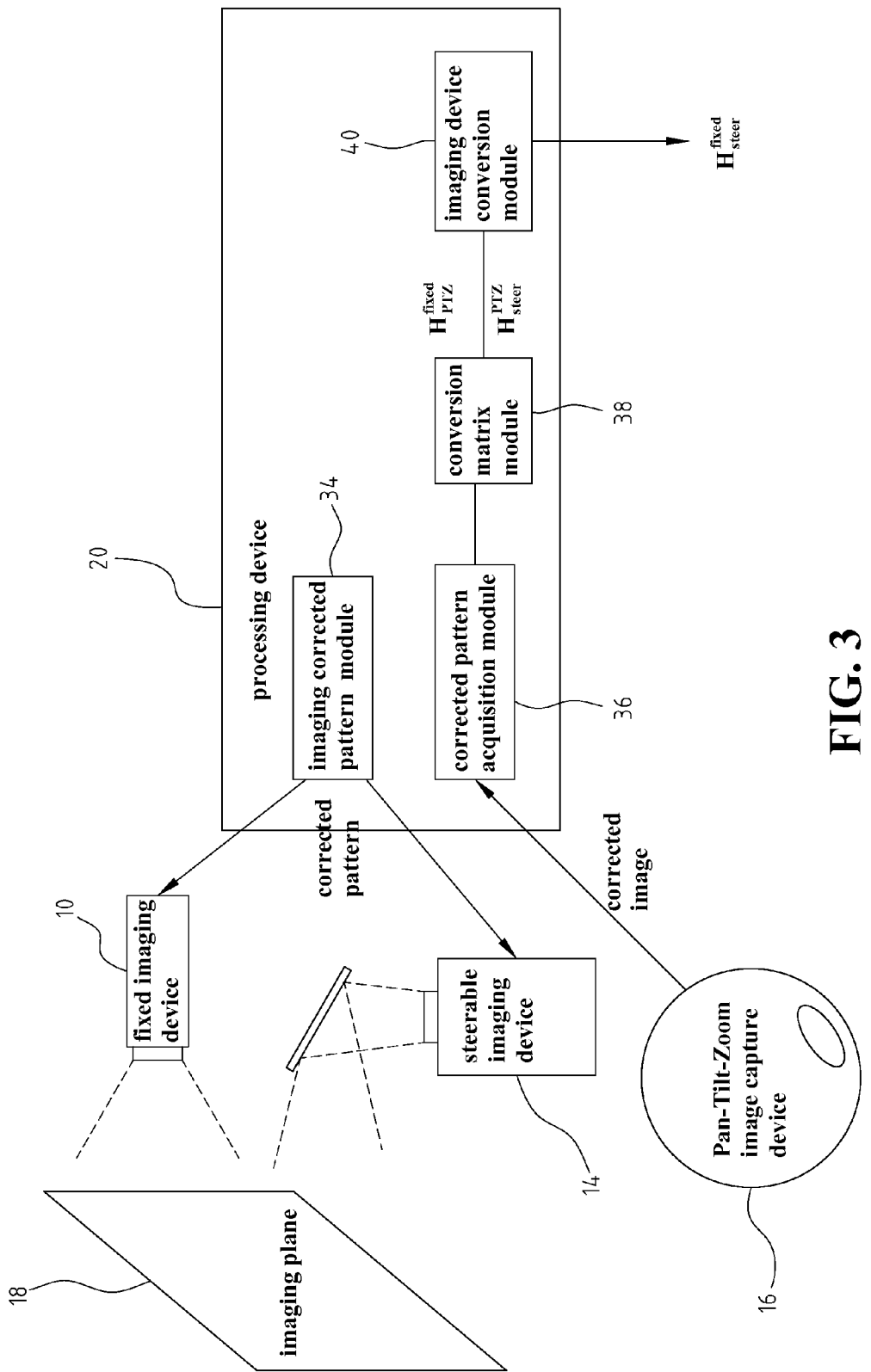
FIG. 3 is a schematic view showing the generating of an imaging device conversion matrix in accordance with the present invention.

Referring to FIG. 3, FIG. 3 is a schematic view showing the imaging device conversion matrix $H_{steer}^{fixed}$ generated in accordance with the present invention. As shown in FIG. 3, the processing device 20 further includes an imaging corrected pattern module 34, a corrected pattern acquisition module 36, a conversion matrix module 38 and an imaging device conversion module 40.

The system mainly applies the same image capturing device to correct two different-resolution imaging devices respectively, and then integrating to generate the imaging device conversion matrix ($H_{steer}^{fixed}$) between the two imaging devices.

In other words, the corrected patterns (such as trellis-like pattern) can be respectively formed in the fixed imaging device 10 and the steerable imaging device 14, which are controlled by the imaging corrected pattern module 34. Later, the corrected pattern acquisition module 36 allows the PTZ image capture device 16, respectively, to capture the patterns presented in the fixed imaging device 10 and the steerable imaging device 14 to obtain the corrected images.

After obtaining the two corrected images, the conversion matrix module 38 is to calculate a first extraction imaging conversion matrix ($H_{PTZ}^{fixed}$) according to the corrected image from the steerable imaging device 14, and a second extraction imaging conversion matrix ($H_{steer}^{PTZ}$) according to the corrected image from the fixed imaging device 10. The imaging device conversion module 40 obtains the imaging device conversion matrix ($H_{steer}^{fixed}$) according to the first extraction imaging conversion matrix ($H_{PTZ}^{fixed}$) and the second extraction imaging conversion matrix ($H_{steer}^{PTZ}$), so that the imaging module 22 (shown in FIG. 1) can apply the imaging device conversion matrix ($H_{steer}^{fixed}$) etc. to stitch the images and project the images on the imaging plane 18.

As mentioned above, the relative position of the reserved region 30a can be designated both by the system and the user.

Figure 4:
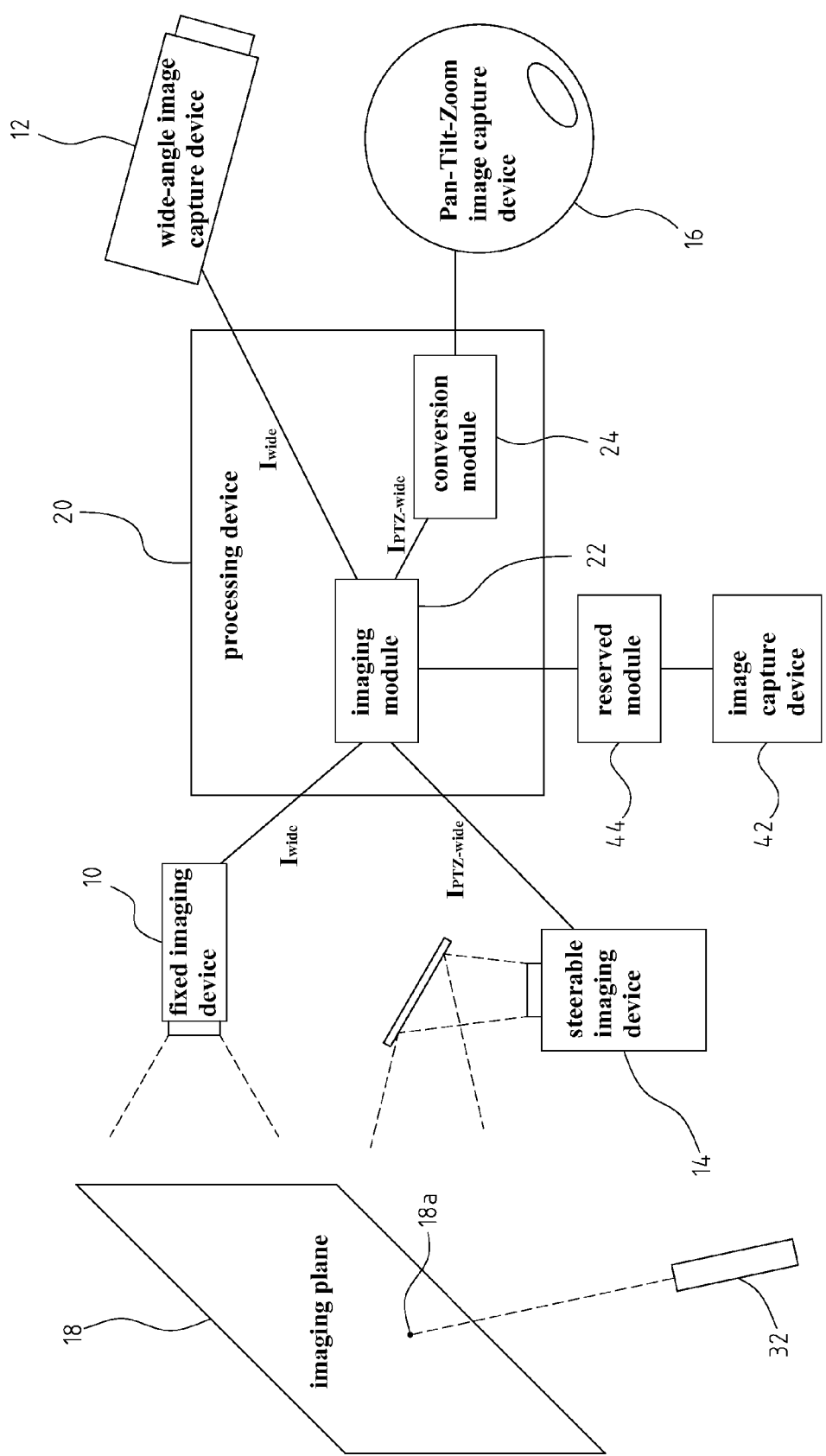
FIG. 4 is a schematic view showing a user-specified reserved region in accordance with the present invention.

Referring to FIG. 4, FIG. 4 is a schematic view showing the user-specified reserved region. As shown in FIG. 4, the system further includes a laser pen 32, an image capture device 42, and a reserved module 44.

When the user uses the laser pen 32 to produce a specified point 18a on the imaging plane having the wide-angle image ($I_{wide}$), the image capture device 42 can extract the PTZ images at least including the specified point 18a from the imaging plane 18, then the reserved module 44 can calculate the relative position of the reserved region 30a within the wide-angle image ($I_{wide}$) 30 based on the position of the specified point 18a.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An image processing system for integrating multi-resolution images using a plurality of multi-resolution image capture devices to extract images from an observed scene, and using a plurality of multi-resolution imaging devices to present a scene image relative to the observed scene, comprising:

an imaging plane;

a wide-angle image capture device, for capturing the observed scene according to a first resolution and producing a wide-angle image;

a Pan-Tilt-Zoom (PTZ) image capture device, for capturing the observed scene according to a second resolution, a designated direction, and a focal distance and producing a Pan-Tilt-Zoom image, wherein the second resolution is higher than the first resolution;

a fixed imaging device, for presenting a processed wide-angle image on the imaging plane according to a third resolution, wherein the processed wide-angle image has at least one reserved region without image information;

a steerable imaging device, for presenting a processed Pan-Tilt-Zoom image on the imaging plane according to a fourth resolution, wherein the processed Pan-Tilt-Zoom image is only presented in a region corresponding to the reserved region of the processed wide-angle image, wherein the fourth resolution is higher than the third resolution;

a conversion module, for converting the Pan-Tilt-Zoom image to a conversion image which is in a coordinate system of the wide-angle image capture device based on an image capture device conversion matrix (homography; $H_{wide}^{PTZ}$); and an imaging module, for applying the fixed imaging device to present the processed wide-angle image on the imaging plane according to the third resolution, and applying the coordinate system of the steerable imaging device to present the processed Pan-Tilt-Zoom image on the imaging plane according to the fourth resolution based on an imaging device conversion matrix ($H_{steer}^{fixed}$), wherein the scene images relative to the observed scenes are presented;

wherein said image processing system further comprises:

an imaging corrected pattern module for the fixed imaging device and the steerable imaging device to respectively present a corrected pattern;

a corrected pattern acquisition module for the Pan-Tilt-Zoom (PTZ) image capture device to capture the corrected patterns presented in the fixed imaging device and the steerable imaging device and to respectively obtain a corrected image;

a conversion matrix module, for calculating a first extraction imaging conversion matrix ($H_{PTZ}^{fixed}$) according to the corrected image from the steerable imaging device, and calculating a second extraction imaging conversion matrix ($H_{steer}^{PTZ}$) according to the corrected image from the fixed imaging device; and an imaging device conversion module, for obtaining the imaging device conversion matrix ($H_{steer}^{fixed}$) according to the first extraction imaging conversion matrix ($H_{PTZ}^{fixed}$) and the second extraction imaging conversion matrix ($H_{steer}^{PTZ}$).

2. The image processing system for integrating multi-resolution images as claimed in claim 1, wherein the image capture device conversion matrix (homography; $H_{wide}^{PTZ}$) is a coordinate conversion matrix between the wide-angle image capture device and the Pan-Tilt-Zoom (PTZ) image capture device.

3. The image processing system for integrating multi-resolution images as claimed in claim 1, wherein the imaging device conversion matrix ($H_{steer}^{fixed}$) is a coordinate conversion matrix between the fixed imaging device and the steerable imaging device.

4. The image processing system for integrating multi-resolution images as claimed in claim 1, further comprising:

a laser pen, used by a user to generate a specified point on the imaging plane including the wide-angle image; and an image capture device, for at least extracting one Pan-Tilt-Zoom image including the specified point from the imaging plane.

* * * * *